(12) United States Patent
Mendez

(10) Patent No.: US 11,645,033 B2
(45) Date of Patent: *May 9, 2023

(54) METHOD AND APPARATUS FOR ACCESSING PROPRIETARY RESOURCES ON A CO-BROWSE SESSION

(71) Applicant: Glance Networks, Inc., Wakefield, MA (US)

(72) Inventor: Deborah Mendez, Arlington, MA (US)

(73) Assignee: Glance Networks, Inc., Wakefield, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/675,222

(22) Filed: Feb. 18, 2022

(65) Prior Publication Data

US 2022/0188060 A1    Jun. 16, 2022

Related U.S. Application Data

(63) Continuation of application No. 16/686,873, filed on Nov. 18, 2019, now Pat. No. 11,269,582.

(Continued)

(51) Int. Cl.
*G06F 3/14* (2006.01)
*G06F 16/958* (2019.01)

(Continued)

(52) U.S. Cl.
CPC .......... *G06F 3/1454* (2013.01); *G06F 16/986* (2019.01); *G06F 40/14* (2020.01); *G06F 40/154* (2020.01); *H04L 67/02* (2013.01)

(58) Field of Classification Search
CPC ...... G06F 40/14; G06F 40/154; G06F 16/986; G06F 3/1454
See application file for complete search history.

(56) References Cited

U.S. PATENT DOCUMENTS 7,149,776 B1    12/2006  Anindo et al.
2011/0203000 A1*  8/2011  Bacus ............. G06F 21/10
                                                713/176

(Continued)

FOREIGN PATENT DOCUMENTS

WO    WO2014/014695    1/2014

OTHER PUBLICATIONS

Search Report from related EP application 19887913.2 dated May 3, 2022 (8 pages).

(Continued)

*Primary Examiner* — Scott T Baderman
*Assistant Examiner* — Seung Woon Jung
(74) *Attorney, Agent, or Firm* — Anderson Gorecki LLP

(57) ABSTRACT

A co-browse service implements a resource acquisition process to enable proprietary resources to be accessed on a co-browse session. In some embodiments, co-browse JavaScript in a visitor browser converts some or all of the resource URLs of the DOM to point to the resource acquisition process so that the agent browser seeks to retrieve the URLs referenced resources from the resource acquisition process rather than from the website. The resource acquisition process, in turn, obtains the resources from the website or the visitor browser. Since the resource acquisition process is able to obtain the proprietary resources on behalf of the agent and provide the proprietary resources to the agent during the co-browse session, the agent is able to have a consistent view of the visitor's browser during the co-browse session.

30 Claims, 2 Drawing Sheets

Related U.S. Application Data

(60) Provisional application No. 62/770,493, filed on Nov. 21, 2018.

(51) Int. Cl.
  *G06F 40/14* (2020.01)
  *G06F 40/154* (2020.01)
  *H04L 67/02* (2022.01)

(56) References Cited

U.S. PATENT DOCUMENTS

2014/0129920 A1   5/2014   Andrei et al.
2015/0281331 A1*  10/2015  Steiner ............... H04L 67/1014
                                                         709/203
2015/0358386 A1   12/2015  Pirnazar

OTHER PUBLICATIONS

Yue Chuan et al.: "RCB: A Simple and Practical Framework for Real-time Collaborative Browsing", USENIX '09: Proceedings of the 2009 conference on USENIX Annual Technical Conference, Jun. 14, 2009 (14 pages).

Mehmet Sayal et al.: "Selection algorithms for replicated Web servers", ACM Signmetrics Performance Evaluation Review, Association for Computing Machinery, New York, NY, vol. 26, No. 3, Dec. 1998 (7 pages).

\* cited by examiner

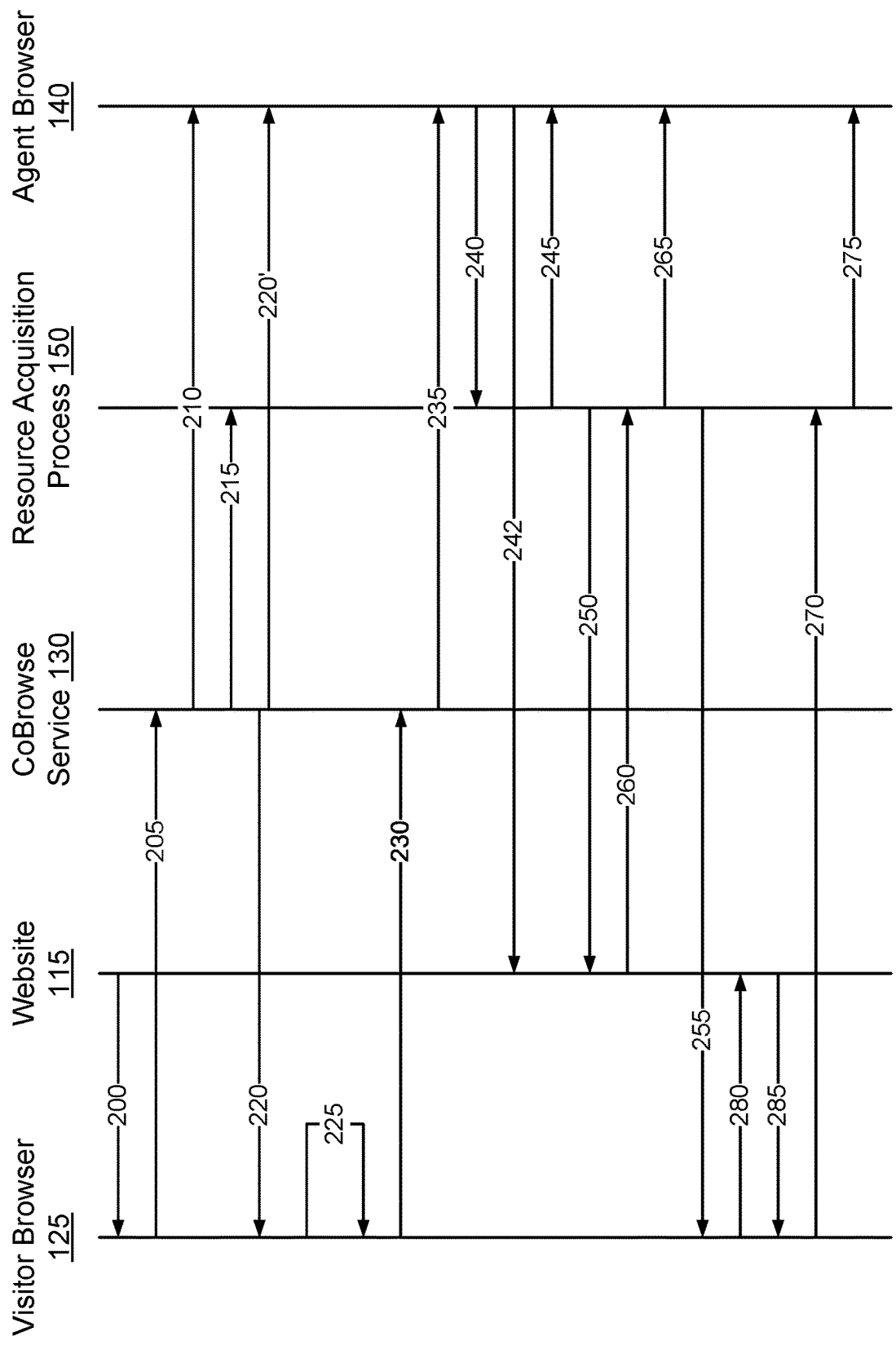

METHOD AND APPARATUS FOR ACCESSING PROPRIETARY RESOURCES ON A CO-BROWSE SESSION

CROSS REFERENCE TO RELATED APPLICATIONS

This application is a continuation of U.S. patent application Ser. No. 16/686,873, filed Nov. 18, 2019, which claims priority to U.S. Provisional Patent Application 62/770,493, filed Nov. 21, 2018, entitled Accessing Proprietary Resources on a Co-Browsing Session, the content of each of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to a method and apparatus for accessing proprietary resources on a co-browse session.

DESCRIPTION OF THE RELATED ART

It is possible for the content of a first browser to be shared and reproduced in a second browser at a geographically remote location. One way to do this is to cause the Document Object Model (DOM) describing the content of the first browser to be forwarded to the second browser. The second browser uses the DOM received from the first browser to recreate the content of the first browser.

Unfortunately, simply having the DOM is inadequate, in some instances, to enable all of the content of the first browser to be reliably reproduced at the second browser. In particular, depending on the manner in which the website is constructed, the content of what is shown in the first browser may be based on resources such as fonts, Cascading Style Sheets (CSS), and images, that require a cookie for access and are therefore only available to the first browser. Since the second browser is not able to obtain the same proprietary resources from the website, the content of the second browser will not correctly mirror what is shown in the first browser. In addition, some websites use CORS headers to prevent a browser on another domain from accessing website resources. CORS in this case prevents the agent viewer from accessing resources directly from the website, but the resources can be accessed by the "resource acquisition process" Accordingly, it would be advantageous to provide a system for enabling resources proprietary to the first browser to be accessed on a co-browse session by the second browser.

SUMMARY

The Summary and Abstract sections are provided herein to introduce some concepts discussed in the Detailed Description below. The Summary and Abstract sections are not comprehensive and are not intended to delineate the scope of protectable subject matter, which is set forth by the Claims presented below.

In some embodiments, a co-browse service implements a resource acquisition process to enable proprietary resources in use on a visitor browser to be accessed by an agent browser on a co-browse session. Some or all of the resource URLs of the visitor's DOM are converted to point to the resource acquisition process, so that the agent browser seeks to retrieve the URLs referenced resources from the resource acquisition process rather than from the website. The resource acquisition process, in turn, obtains the resources from the website or the visitor. Since the resource acquisition process is able to obtain the proprietary resources on behalf of the agent, and provide the proprietary resources to the agent during the co-browse session, the agent is able to have a consistent view of the visitor's browser during the co-browse session.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 2 is a swim lane diagram showing the transmission of information between several of the components of FIG. 1 in connection with providing to proprietary resources on a co-browse session, according to some embodiments.

DETAILED DESCRIPTION

Figure 1:
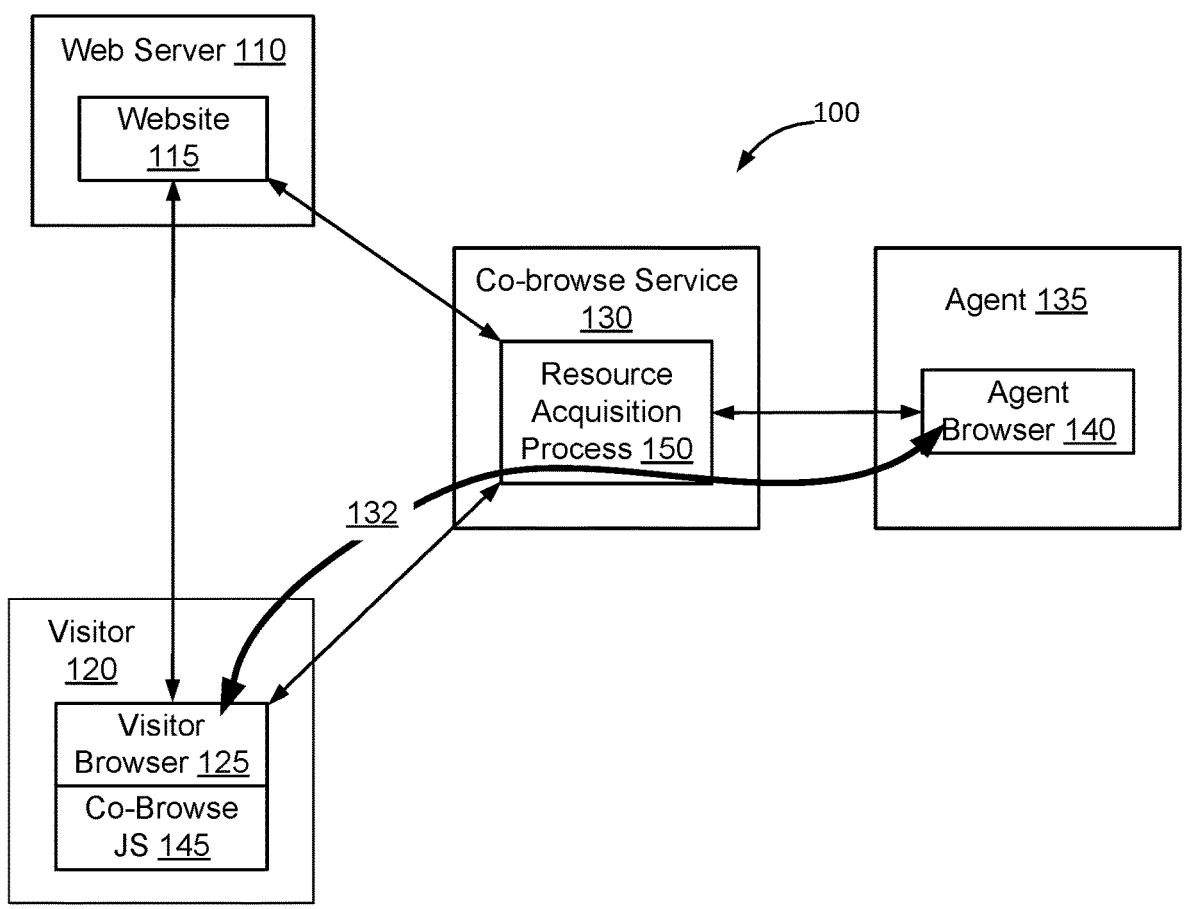
FIG. 1 is a functional block diagram of a network of components for accessing proprietary resources on a co-browse session, according to some embodiments.

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

FIG. 1 is a functional block diagram of a network 100 of components for accessing proprietary resources on a co-browse session 132 according to some embodiments. As shown in FIG. 1, in some embodiments a web server 110 hosts website 115. A visitor 120 accesses website 115 using visitor browser 125 to load web pages from the web server 110. A co-browse service 130 facilitates a co-browse session 132 on which an agent 135 is able to view the content of the visitor browser 125 in agent browser 140.

In some embodiments, the web pages loaded from web server 110 are scripted with co-browse JavaScript 145. Alternatively, the co-browse JavaScript 145 may be loaded to visitor browser 125 as a plugin or extension. Co-browse JavaScript 145 causes the Document Object Model (DOM) describing the webpage loaded in visitor browser 125 to be forwarded to the co-browse service 130. Co-browse service 130 forwards the DOM to the agent browser 140 on co-browse session 132 to enable the agent browser 140 to have a consistent view of the content of the visitor's browser 125.

Additional details of how an example co-browse system of this nature may be implemented is provided in U.S. Pat. No. 9,736,214, entitled INTEGRATING CO-BROWSING WITH OTHER FORMS OF INFORMATION SHARING, the content of which is hereby incorporated herein by reference.

When the agent browser 140 receives the DOM describing the content of visitor browser 125, conventionally the agent browser 140 would request the resources described in the DOM from the website 115. However, there are instances where the agent browser 140 will not be able to obtain the same resources from website 115 as visitor browser 125 is able to obtain from website 115. For example, depending on the manner in which the website 115 is constructed, the visitor browser 125 may have fonts, Cascading Style Sheets (CSS), and images, that will only be served to a client presenting a cookie, such as the visitor browser 125. Likewise, where agent browser 140 is executing a web application that is in a different domain than the website 115, Cross-Origin Resource Sharing (CORS) restrictions may prevent the agent browser 140 from accessing restricted resources on website 115. As used herein, the term "proprietary" is defined to refer to resources that are cookie and/or CORS protected.

For example, many companies have resources on their websites which are inaccessible to the agent browser 140 in a co-browse session 132. Some typical scenarios include fonts or CSS that cannot be accessed cross-origin. Therefore, if the agent browser 140 is on one domain and the resources are on another domain, CORS restrictions may prevent the agent browser 140 from accessing the resources. As another example, the resources may be images that are specific to the visitor browser 125, such as account-specific images like bank check images, which may require a session cookie that the agent browser 140 does not have and that the co-browse service 130 does not have.

According to some embodiments, co-browse service 130 instantiates a resource acquisition process 150 for the co-browse session 132. The co-browse JavaScript 145 copies the DOM of browser 125 and forwards the DOM to the co-browse service 130 on the co-browse session 132. The agent browser 140 receives the forwarded DOM on the co-browse session 132 and requests at least some of the resources referenced in the DOM from the resource acquisition process 150 rather than from website 115. The resource acquisition process 150 services the resource requests by submitting requests for the resources to both the website 115 and to the visitor browser 125. When the resource acquisition process 150 receives the resources from either visitor browser or website, it returns the requested resources to the agent browser 140. Use of a resource acquisition process 150 enables proprietary resources to be obtained on behalf of the agent browser 140 so that the agent browser 140 is more closely able to replicate the content of the visitor browser 125.

FIG. 2 is a swim lane diagram showing the transmission of information between several of the components of FIG. 1 for accessing proprietary resources on a co-browse session 132, according to some embodiments. As shown in FIG. 2, at arrow 200 visitor browser 125 downloads a web page and co-browse JavaScript 145 from website 115. At arrows 205 and 210, a co-browse session 132 is started. There are many ways to start a co-browse session 132. For example, the visitor browser 125 may initiate the co-browse session 132 that is then joined by the agent browser 140, the agent may trigger the visitor to initiate the session that is then joined by the agent, or the agent browser 140 may initiate the co-browse session 132 and the visitor browser 125 can then join the co-browse session 132 in display mode. Regardless of how the co-browse session 132 is started, according to some embodiments, the co-browse service 130 instantiates a resource acquisition process (arrow 215) which is used during the co-browse session 132 by agent browser 140 to access at least some of the resources specified in the shared DOM of the visitor browser 125.

In some embodiments, the visitor co-browse JavaScript 145 converts URLs of the DOM of visitor browser 125 to point to the resource acquisition process 150. According, in some embodiments, once the resource acquisition process 150 has been instantiated for use in the co-browse session 132, a URL of the resource acquisition process 150 is forwarded to the visitor browser 125 (arrow 220). Alternatively, in some embodiments, the visitor co-browse JavaScript 145 can derive the URL of the resource acquisition process 150 based on the server at the co-browse service 130 used to host the co-browse session 132, e.g. [co-browse server]/agent/resource/[session ID]. The visitor browser 125 uses the URL of the resource acquisition process 150 to convert relative and absolute resource URLs in the DOM to cause the URLs to point to the resource acquisition process 150 (arrow 225). Although some embodiments have the URL conversion implemented by co-browse JavaScript 145 in visitor browser 125, in other embodiments the URL conversion is done at another component of network 100, for example by agent browser 140, co-browse service 130, or by resource acquisition process 150.

In an embodiment where the URL conversion process is implemented at the visitor browser, once the correct set of URLs referenced in the DOM are converted by the visitor co-browse JavaScript 145, the modified DOM is forwarded from the visitor browser 125 to the co-browse service 130 (arrow 230) and the modified DOM is forwarded from the co-browse service 130 to the agent browser 140 (arrow 235). In embodiments where the URL conversion is done at the co-browse service 130, the visitor co-browse JavaScript forwards the DOM of visitor browser 125 to the co-browse service 130 (arrow 230), the co-browse service 130 implements the URL conversion process, and forwards the modified DOM to the agent browser 140 (arrow 235).

In embodiments where the agent browser 140 implements the URL conversion process, the co-browse service 130 forwards a URL of the resource acquisition process 150 to the visitor browser 125 (arrow 220'). Alternatively, in some embodiments, the agent browser 140 can derive the URL of the resource acquisition process 150 based on the server at the co-browse service 130 used to host the co-browse session 132, e.g. [co-browse server]/agent/resource/[session ID]. Once the agent browser 140 has the URL of the resource acquisition process 150, the agent browser 140 can implement the URL conversion process to cause at least a subset of the URLs referenced in the DOM to point to the resource acquisition process 150.

Regardless of where the URL conversion process is implemented, after URL conversion some or all of the URLs of the modified DOM that is loaded to the agent browser 140 will point toward the resource acquisition process 150. Accordingly, when agent browser 140 seeks to load the webpage described by the DOM, the agent browser 140 will issue some or all of the resource requests to the resource acquisition process 150 (arrow 240).

In some embodiments all of the URLs of the DOM are converted to point to the resource acquisition process 150. In these embodiments, agent browser 140 requests all resources referenced in the DOM from the resource acquisition process 150 (arrow 240).

In other embodiments, a first subset of the URLs of the DOM are converted to point to the resource acquisition process 150. In these embodiments, the first subset of resources are requested by the agent browser 140 from the resource acquisition process 150 (arrow 240) and the other resources are requested by the agent browser 140 from the website 115 (arrow 242). Accordingly, when only some of the URLs of the modified DOM point toward the resource acquisition process 150, when the agent browser 140 seeks to load the webpage described by the DOM, the agent browser 140 will issue resource requests associated with the converted URLs to the resource acquisition process 150 (arrow 240) and will issue resource requests for non-converted URLs to the website 115 (arrow 242) in a normal manner.

When the resource acquisition process 150 receives a resource request (arrow 240), if the resource acquisition process 150 has the requested resource cached, the resource acquisition process 150 will forward the requested resource to the agent browser 140 (arrow 245). If the resource acquisition process 150 has not previously obtained and cached the requested resource, the resource acquisition process 150 requests the resource from website 115 (arrow 250), from visitor browser 125 (arrow 255), or from both website 115 and visitor browser 125 (arrows 250, 255).

In some embodiments, the resource acquisition process 150 requests the resource from both website 115 and visitor browser 125 without first waiting for a response from one or the other. For example, in some embodiments the resource acquisition process 150 asks the visitor browser 125 for the resource (arrow 255) and, before receiving a response from the visitor browser 125 (arrow 270), also sends out a request for the same resource to the website 115 (arrow 250). Likewise, in some embodiments the resource acquisition process 150 asks the website 115 for the resource (arrow 250) and, before receiving a response from the website 115 (arrow 260), also sends out a request for the same resource to the visitor browser 125 (arrow 255).

In some instances, a requested resource is available to the resource acquisition process 150 from the website 115. If the requested resource is available from the website 115, the website 115 forwards the requested resource to the resource acquisition process 150 (arrow 260) and the resource acquisition process 150 fulfills the resource request by forwarding the requested resource to the agent browser 140 (arrow 265). In some instances, a requested resource is available to the resource acquisition process 150 from the visitor browser 125. If the requested resource is available from the visitor browser 125, the visitor browser 125 forwards the requested resource to the resource acquisition process 150 (arrow 270), and the resource acquisition process 150 fulfills the resource request by forwarding the requested resource to the agent browser 140 (arrow 275).

In some instances, although the visitor browser 125 will already have the requested resource in its cache, JavaScript in the browser doesn't have access to those resources as flat files. For example, the browser may have a font loaded, and CSS may reference the font, but the JavaScript doesn't have a handle to the font as a file. In this case, the visitor browser 125 makes a XMLHttpRequest (XHR request) to the website 115 (arrow 280) for the file. The visitor browser 125 may in fact pull the actual file from the cache, or, if the resource is from a different domain from the website 115, the visitor browser 125 may have to re-issue a request to the website 115 using CORS headers. When the requested resource is obtained (arrow 285) it is then forwarded to the resource acquisition process 150 (arrow 270) to be forwarded to the agent browser 140 (arrow 275).

In some instances, the requested resource will be available to the resource acquisition process 150 from both the website 115 and from the visitor browser 125. In some embodiments, when the resource acquisition process 150 receives a first response from either the website 115 (arrow 260) or the visitor browser 125 (arrow 270), the resource acquisition process 150 forwards the response to the agent browser 140 (arrow 265 or 275) to fulfill the resource request. Optionally, once the resource is received from one source, the request on the other source may be canceled.

In some instances, the resource acquisition process 150 will receive a response from both the website 115 (arrow 260) and the visitor browser 125 (arrow 270). In some embodiments, if both responses return an http status 200 (ok) the responses are generally equivalent and the resource acquisition process 150 can select either response to fulfill the resource request to the agent browser 140. One exception would be if one of the responses returns a content-type text/html instead of the expected image, font, or CSS content type. That generally means that the web server 110 returned an error page instead of the resource itself. In some embodiments, if the visitor browser 125 or the website 115 returns an error and the other returns an http status 200 (ok), the reply with the status 200 is used. If both return an http error status codes, then one of the responses may be selected, e.g. the response with the lower error code, although how the response is selected in this instance may vary depending on the implementation.

In some embodiments, the resource acquisition process 150 caches resources of website 115 and serves the website resources to the agent browser 140 (arrow 245).

In some embodiments, when uploading html to the co-browse service 130, the visitor co-browse JavaScript 145 adjusts the <base> tag and resource URLs so that relative website resource requests will all be redirected through the resource acquisition process 150. The visitor co-browse JavaScript 145 also converts all absolute Hypertext Reference (href) and Source (src) attributes to relative, so that when combined with the <base> tag, the href or src URL will refer to a URL on the resource acquisition process 150.

When the resource acquisition process 150 receives a request for a website resource from the agent browser 140, it serves the website resource from its local cache (arrow 245). If the resource acquisition process 150 does not yet have the resource, it requests the resource from the visitor browser 125 (arrow 255) by sending a message on the visitor computer 120's sockjs connection. If the visitor browser 125 is not currently connected to the co-browse session 132, for example because the visitor is in the process of navigating to a new page, the resource acquisition process 150 adds the request to session state to be handled by the visitor co-browse JavaScript 145 the next time the visitor browser 125 connects. The resource acquisition process 150 also requests the resource directly from the web server 110 (arrow 250).

The visitor browser 125 uploads resources to the resource acquisition process 150 (arrow 270) and/or the web server 110 responds with the resource to the resource acquisition process 150 (arrow 260). The resource acquisition process 150 stores the resources in a session-specific area. The resource acquisition process 150 scans any CSS files that were uploaded by the visitor browser 125 or returned by the web server 110, looking for URLs to images, fonts, or other CSS files, and converts absolute URLs in the CSS file to relative URLs.

In some embodiments the cache is used to store resources specific to a single visitor 120. In some embodiments, the resource acquisition process 150 removes all cached resources at the end of the co-browse session 132. In other embodiments a common cache is used to store commonly requested resources to enable those commonly requested resources to be sourced from the cache for co-browse sessions 132 with multiple visitors 120. In this instance, the cached resources may not be removed at the end of the co-browse session 132.

Base Tag

In connection with converting the URLs of the web page, in some embodiments, the visitor co-browse JavaScript 145 adds the following base tag, so that relative URLs on the page all refer to the server at the co-browse service 130 hosting the resource acquisition process 150:

<base href="/agent/resource/sessionid/path-to-visitor-page">

If a page already has a base tag with an href, the visitor co-browse JavaScript 145 modifies it to point to the server at the co-browse service 130 hosting the resource acquisition process 150. For example:

<base href="https://otherserver.abc.com/a/b/c"> is modified to

<base href="/agent/resource/sessionid/https-otherserver-.abc.com/a/b/c"> Note that absolute URLs are mapped to a URL path item by making some substitutions:

:// or // maps to -/ This allows these URLs to look like relative URLs to the agent browser 140, while the resource acquisition process 150 is still able to map them back to the original URL. In some implementations, this mapping is implemented on the visitor side in a JavaScript function in visitor co-browse JavaScript 145. For iframes, the "frame path" will be inserted in the base tag as well. See the section on iframes below.

Absolute URLs in the DOM

In some embodiments, absolute URLs in <img> and <link> tags are converted to relative URLs, so that the agent browser 140 sends requests for those resources to the resource acquisition process 150. For example:

<link href="https://otherserver.abc.com/a/b/c/style.CSS"> is modified to:

<link href="https-otherserver.abc.com/a/b/c/style.CSS">

In some embodiments, <img> src and srcset attributes are similarly modified.

In some embodiments, the co-browse JavaScript 145 only converts the URLs of certain types of files, so that the agent browser 140 will obtain the unconverted resources directly from the website 115. For example, in some embodiments the visitor co-browse JavaScript 145 converts URLs that relate to CSS, img, and font resources, but does not convert URLs related to aspects of the website 115 that are publicly available and not proprietary to the visitor browser 125. In this manner, the co-browse service 130 is not burdened with obtaining resources for the agent browser 140 that are generally available directly from the website 115.

Absolute URLs in CSS Files

When CSS files are uploaded by the visitor co-browse JavaScript 145, the resource acquisition process 150 scans them for absolute URLs. Absolute URLs are converted to URLs on the resource acquisition process 150 following the same convention.

Call Resources Map

In some embodiments, the resource acquisition process 150 tracks all pending and completed resource requests to the visitor 120 in a call resources map. The call resources map is a map of:

resourceURL=>{Future}

The resourceURL in the call resources map is an absolute URL, except without the protocol. Using absolute URLs allows reuse of resources regardless of whether the path specified in the page is relative or absolute. "Future" in this context represents a computing task which may already be completed, or is yet to be completed at some future time.

Resource Requests to the Server at the Co-Browse Service Hosting the Resource Acquisition Process In some embodiments, resource requests to the resource acquisition process 150 have a convention for specifying the URL of the original location of the resource on the website. An example resource request URL may be: /agent/resource/sessionid/[resource path]

For example, the URL:

/agent/resource/sessionid/https-otherserver.abc.com/a/b/c/style.CSS would be used to request a resource at absolute URL:

https://otherwserver.abc.com/a/b/c/style.CSS or:

/resource/sessionid/a/b/c/style.CSS would be used to request a resource at relative URL:

a/b/c/style.CSS where the URL is interpreted by the resource acquisition process 150 as relative to the visitor browser 125's current page.

In some embodiments, resource requests are denied with http status 401 (unauthorized) if the agent browser 140 does not present valid credentials for the co-browse session 132 specified by the co-browse session id in the request.

In some embodiments, the resource acquisition process 150 maps a resource path to a file name as follows:

cacheroot/sessionid/[resource path]

in which cacheroot is a configuration setting for the resource acquisition process indicating the root directory for cached files. In some embodiments, certain characters in the file URL will be substituted with underscores in order to generate a valid path name.

When a resource request is received from the agent browser 140, if the resource is not found in the file cache, the resource acquisition process 150 looks up the resource in the call resources map. In some embodiments, files that are retrieved by the resource acquisition process in the context of one session may be cached and used by the resource acquisition process in connection with other sessions. Accordingly, in some embodiments the resource acquisition process first looks to determine if a resource is cached before looking in the URL-future map. If the resource has never been requested by the resource acquisition process 150, the resource acquisition process 150 forwards these requests to the visitor browser 125 as:

message type: resreq message payload: {URL: [absolute/relative URL as determined by resource path]}

The resource acquisition process 150 also adds an entry for the resource to the call resources map.

If the resource was previously requested by the resource acquisition process 150 but the resource request has not yet been fulfilled, the resource acquisition process 150 waits for the resource.

If the resource request has already completed (or when it completes), the resource acquisition process 150 responds to the request by sending the file, if it has been successfully retrieved. In some embodiments, cache headers included in the reply to the agent are set to cache the file indefinitely since the file will only be valid for the length of the co-browse session 132 anyway. The content-type header of the resource is set to the content-type that the web server 110 originally returned when it served the resource to the visitor browser 125 or to the resource acquisition process (see "Visitor Handling of Resource Requests"). Whatever http status code the visitor browser 125 or resource acquisition process receives when retrieving the resource, that http status code is returned to the agent browser 140.

In some embodiments, to prevent malicious JavaScript from running on the agent browser 140, Content Security Policy (CSP) headers are used and the Co-browse service includes the CSP headers on all pages served to the agent browser 140. The CSP headers restrict the domains from which JavaScript files can be retrieved (e.g. to the co-browse service 130), and also prevent inline JavaScript in the page from running. A CSP compatible browser will thus only execute scripts loaded in source files received from an allowed list of domains, ignoring all other scripts. Therefore, even if the visitor 120 sends malicious script in an attempt to attack the agent's browser 140, or if malicious script is somehow downloaded from the website 115, the malicious script will not execute on the agent browser 140. In addition, the resource acquisition process will respond with a 401 error to any requests for JavaScript resources.

Visitor Handling of Resource Requests

The visitor browser 125 handles resource requests by making an XMLHttpRequest (XHR) request for the specified resource to the website 115 (arrow 280) and, upon receiving the response (arrow 285), uploads the requested resource to the resource acquisition process 150 (arrow 270) using a post request to the Co-browse service at/visitor/UR. In some embodiments the visitor browser 125 sends the http status code and content type with the post, and the resource acquisition process 150 tracks this information.

CORS and Credentials

In some embodiments, the XMLHttpRequest (XHR) initial request for a resource from the visitor browser 125 to the web server 110 (arrow 280) includes credentials, in case credentials are required by the web server 110 to access the resource. In some cases, the web server 110 doesn't need credentials and won't allow a cross origin request which includes them. In this case, the visitor browser 125 may report the error to the console but not to the JavaScript engine. Thus, the XHR request will simply appear to fail as if, for example, the network connection were down. Because of this, any time an XHR request for a resource fails without an http response, the visitor browser 125 retries the request on the web server 110 (resends request on arrow 280) without credentials.

Resource Acquisition Process Upload Resource Request Handler

In some embodiments, the resource acquisition process 150 has an Upload Resource (UR) request handler. The visitor browser issues a POST request to the Upload Resource handler at the url on the co-browse service: /visitor/UR/ssnid=[session id&]url=[resource url]&httpstatus=[http status code] where resource url is the url of the resource and http status code is the status code returned by the website in response to the visitor's request for the resource. The body of the POST contains the resource file contents. The visitor browser sets the content-type header on this request according to the content-type header on the response to the visitor's resource request. If the visitor browser 125 successfully uploads the resource, the UR request handler saves the body of the post to a file using the resource path to file path mapping described above.

The UR request handler looks up the resource in the call resources map and resolves the Future by setting its result to the resource content-type (extracted from the content-type header on the UR request) and the http status (from the httpstatus query string parameter). The resource acquisition process 150 needs content type and http status in order to respond to the resource request.

If the visitor browser 125 failed to retrieve the resource potentially due to a CORS error (indicated by httpstatus 0), the resource acquisition process 150 attempts to retrieve the resource itself. In some embodiments, the resource acquisition process 150 attempts to retrieve the resource from both the web server 110 and from the visitor browser 125 at the same time without first waiting for the request on the visitor browser 125 to fail.

Timeouts

The visitor browser 125 should generally respond to a resource request by posting to the UR request handler, even if it is with a failure status. However, if (1) a JavaScript error or network issue occurs and prevents that process from completing as expected or (2) the visitor browser 125 navigates before retrieving and uploading the resource, the resource acquisition process 150 should not leave the agent browser 140 hanging indefinitely waiting for a response. For example, Chrome and possibly other browsers will not render the page until the web server 110 provides some sort of response to resource requests. Accordingly, if the visitor browser 125 fails to respond to a resource request within a time limit, and the web server 110 fails to respond with the resource within a timeout period, the resource acquisition process 150 returns an http status 504 (gateway timeout) to the agent browser 140. If the visitor browser 125 navigates, all outstanding Futures for resource requests are cancelled.

Iframes

Requests for resources that are referenced within an iframe are handled by the "framecall" (i.e. the subsession) associated with the frame. However, there is only one call resources map on the top-level call, to take advantage of the fact that resources can be shared across iframes.

Frame URL

To provide iframe resources, in some embodiments a frame resource acquisition process URL (frame path) is defined. Each frame resource acquisition process URL maps uniquely to an iframe. In some embodiments, the frame resource acquisition process URL is derived from the iframe href and therefore does not change when an iframe is re-instantiated on the visitor 120 side. The invariance of the frame resource acquisition process URL allows both the agent browser 140 and the resource acquisition process 150 to reuse cached resources that are referenced in iframes.

The frame resource acquisition process URL can be anything, as long as it maps uniquely to the iframe href. The visitor co-browse JavaScript 145 chooses the frame resource acquisition process URL and sends it to the resource acquisition process 150 when the frame first uploads its DOM.

When the visitor browser 125 formulates the <base> tag to send with the DOM up to the agent browser 140, if the visitor co-browse JavaScript 145 is running in an iframe, the visitor browser 125 appends/co-browse-[frame_resource_acquisition_process_URL] to the base tag that is sent to the agent. All resource requests from the agent browser 140 for resources within the iframe will then include the frame resource acquisition process URL.

Handling Requests for Frame Resources

Note that only the iframe which references the resource can handle the resource request, because the iframe may be on a different domain from the parent. Were the parent to request the resource, it would be a "cross domain" request and might fail.

When the resource acquisition process 150 receives a resource request, if the URL contains a frame resource acquisition process URL, the resource acquisition process 150 uses the frame resource acquisition process URL to identify the framecall. The resource acquisition process 150 then issues the resource request to the corresponding iframe on the visitor browser 125. The visitor browser 125 can then request the resource, if it is a relative URL, relative to that iframe's location.href. When the visitor browser 125 receives the resource and uploads the resource to the resource acquisition process 150, the visitor browser 125 includes the frame_resource_acquisition_process_url on the/visitor/UR URL as an additional frameid query string parameter so the resource acquisition process 150 can identify the frame to which the resource belongs. In some embodiments, the resource acquisition process 150 handles iframe resources the same as top level resources, in that the resource acquisition process 150 simultaneously requests them from both the website 115 and visitor browser 125.

Relative URLs in Frame Stylesheets

If a stylesheet within an iframe includes a relative URL, the request by the agent browser 140 to the resource acquisition process 150 for the relative resource will be:

/agent/resource/ssnid/frame_resource_acquisition_process_url/path-to-stylesheet/relative-url-for-resource Resources within iframes are stored in the file cache under the directory ssnid/frame_resource_acquisition_process_url.

Visitor Navigation

In some embodiments, if the visitor browser 125 navigates to a new page before fulfilling outstanding resource requests, co-browse JavaScript on the new page must take over the task of downloading those resources from the website 115 and uploading them to the resource acquisition process 150. To facilitate this, the resource acquisition process 150 adds any outstanding resource requests to session state and removes them as they are fulfilled. The visitor co-browse JavaScript 145, upon page load, fulfills any outstanding resource requests. In other embodiments, if the visitor browser 125 navigates to a new page before fulfilling outstanding resource requests, the resource acquisition process 150 cancels the outstanding requests. After navigation, if the new page is scripted with co-browse JavaScript or if the visitor co-browse JavaScript 145 is persistent (cookie, extension), the whole process starts over again for resources on the new page.

Multiple Agents

If there are multiple agents 135 in a co-browse session 132, multiple requests will be made by each of the agent browsers 140 of the multiple agents 135 to the resource acquisition process 150 for the same resources. The resource acquisition process 150 should ensure that only one request (arrow 255) is forwarded to the visitor browser 125. Therefore, the resource acquisition process 150 will check co-browse session 132 state for an existing outstanding request for the resource before issuing a new request for the same resource to the visitor browser 125.

Binary Files

Certain browsers may not support downloading or uploading binary files with an XMLHttpRequest (XHR) request. An XHR request is an API in the form of an object, who's method transfers data between a web browser and a web server. Therefore, if the visitor browser 125 is implemented using one of these browsers, one possible workaround is to download the binary files into a string with custom encoding. The string is then decoded back to binary at the resource acquisition process 150.

Pre-Caching

Because it may take some time to obtain resources from the visitor browser 125, in some embodiments the visitor browser 125 scans the page for CSS files and pre-uploads them when the co-browse session 132 first starts, rather than waiting for the agent browser 140 to issue requests for these resources via the resource acquisition process 150. CSS files are critical to accurately render the page (as compared to fonts and images) since they affect the entire page layout. By pre-caching the CSS files at the resource acquisition process 150, the resource acquisition process 150 can more quickly provide these resources to the agent browser 140 when they are requested on the co-browse session 132.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A co-browse system for providing proprietary resources on a co-browse session, comprising:

a co-browse service intermediate a visitor computer and an agent computer, the co-browse service being configured to implement a co-browse session between the visitor computer and the agent computer and having a resource acquisition process instantiated thereon configured to acquire the proprietary resources on the co-browse session;

the visitor computer having a first browser instantiated thereon, the first browser having a DOM describing content of the first browser, the DOM containing objects with URLs pointing to a first website, at least some of the objects being the proprietary resources, the first browser further having co-browse script loaded therein, the co-browse script configured to copy the DOM of the first browser and forward the DOM of the first browser to the agent computer via the co-browse service on the co-browse session;

the agent computer having a second browser instantiated thereon, the second browser being configured to load the DOM of the first browser received on the co-browse session and request the proprietary resources referenced in the DOM from the resource acquisition process;

wherein the proprietary resources are resources that are fonts and Cascading Style Sheets (CSS) that are Cross-Origin Resource Sharing (CORS) protected, or that are both cookie and CORS protected, and wherein the resource acquisition process is configured to concurrently request the proprietary resources requested by the agent computer from both the visitor computer and from the first website.

2. The co-browse system of claim 1, wherein the co-browse script at the visitor browser is configured to convert a first subset of the URLs of the DOM of the first browser to cause the first subset of URLs to point at the resource acquisition process instead of to the first website prior to transmission of the DOM to the co-browse service on the co-browse session.

3. The co-browse system of claim 2:
wherein the first subset of URLs are URLs relating to images, fonts, and Cascading Style Sheets (CSS); and
wherein the proprietary resources further comprise the images.

4. The co-browse system of claim 2, wherein a URL of the resource acquisition process is provided by the co-browse service to the co-browse script on the co-browse session, and wherein the co-browse script is configured to convert the first subset of the resource URLs to point to the URL of the resource acquisition process.

5. The co-browse system of claim 2, wherein a URL of the resource acquisition process is created by the co-browse service based on an identity of a co-browse server identified by the co-browse service to host the co-browse session, and wherein the co-browse script is configured to convert the first subset of the resource URLs to point to the URL of the resource acquisition process.

6. The co-browse system of claim 2, wherein the co-browse script is further configured to receive requests for resources associated with the first subset of the URLs from the resource acquisition process and is configured to respond to the requests for resources by providing the requested resources to the resource acquisition process.

7. The co-browse system of claim 6, wherein the co-browse script is further configured to process the requests for resources by asking for the resources from the website.

8. The co-browse system of claim 1, wherein the co-browse service has a process instantiated thereon that is configured to convert a first subset of the URLs of the DOM of the first browser to cause the first subset of URLs to point at the resource acquisition process instead of to the first website in connection with transmission of the DOM from the first browser to the agent computer.

9. The co-browse system of claim 1, wherein the agent computer has a process instantiated thereon that is configured to convert a first subset of the URLs of the DOM of the first browser to cause the first subset of URLs to point at the resource acquisition process instead of to the first website.

10. The co-browse system of claim 1, wherein the resource acquisition process is configured to:
receive a first resource request from the second browser, the first resource request having a URL identifying the resource acquisition process, and further specifying a network address resolvable to a first of the proprietary resources associated with the first website;
concurrently issue, by the resource acquisition process, a second resource request for the first of the proprietary resources to the first browser, and a third resource request for the first of the proprietary resources to the first website; and respond, by the resource acquisition process to the first resource request, with the first of the proprietary resources when the first of the proprietary resources is received from either the first browser or from the first website.

11. A system for providing proprietary resources on a co-browse session, comprising:
one or more processors and one or more storage devices storing instructions that are operable, when executed by the one or more processors, to cause the one or more processors to perform operations comprising:
instantiating a co-browse service intermediate a visitor computer and an agent computer, the co-browse service being configured to implement a co-browse session between the visitor computer and the agent computer and having a resource acquisition process instantiated thereon configured to acquire the proprietary resources on the co-browse session;
the visitor computer having a first browser instantiated thereon, the first browser having a DOM describing content of the first browser, the DOM containing objects with URLs pointing to a first website, at least some of the objects being the proprietary resources, the first browser further having co-browse script loaded therein, the co-browse script configured to copy the DOM of the first browser and forward the DOM of the first browser to the agent computer via the co-browse service on the co-browse session;
the agent computer having a second browser instantiated thereon, the second browser being configured to load the DOM of the first browser received on the co-browse session and request the proprietary resources referenced in the DOM from the resource acquisition process; and
wherein the proprietary resources are resources that are fonts or Cascading Style Sheets (CSS) that are Cross-Origin Resource Sharing (CORS) protected, and that are both cookie and CORS protected, and wherein the resource acquisition process is configured to concurrently request the proprietary resources requested by the agent computer from both the visitor computer and from the first website.

12. The system of claim 11, wherein the co-browse script at the visitor browser is configured to convert a first subset of the URLs of the DOM of the first browser to cause the first subset of URLs to point at the resource acquisition process instead of to the first website prior to transmission of the DOM to the co-browse service on the co-browse session.

13. The system of claim 12:
wherein the first subset of URLs are URLs relating to images, fonts, and Cascading Style Sheets (CSS); and
wherein the proprietary resources further comprise the images.

14. The system of claim 12, wherein the operations further include providing a URL of the resource acquisition process by the co-browse service to the co-browse script on the co-browse session, and wherein the co-browse script is configured to convert the first subset of the resource URLs to point to the URL of the resource acquisition process.

15. The system of claim 12, wherein the operations further include creating a URL of the resource acquisition process by the co-browse service based on an identity of a co-browse server identified by the co-browse service to host the co-browse session, and wherein the co-browse script is configured to convert the first subset of the resource URLs to point to the URL of the resource acquisition process.

16. The system of claim 12, wherein the co-browse script is further configured to receive requests for resources associated with the first subset of the URLs from the resource acquisition process and is configured to respond to the requests for resources by providing the requested resources to the resource acquisition process.

17. The system of claim 16, wherein the co-browse script is further configured to process the requests for resources by asking for the resources from the website.

18. The system of claim 11, wherein the operations further converting, by the co-browse service, a first subset of the URLs of the DOM of the first browser to cause the first subset of URLs to point at the resource acquisition process instead of to the first website in connection with transmission of the DOM by the co-browse service from the first browser to the agent computer.

19. The system of claim 11, wherein the agent computer has a process instantiated thereon that is configured to convert a first subset of the URLs of the DOM of the first browser to cause the first subset of URLs to point at the resource acquisition process instead of to the first website.

20. The system of claim 11, wherein the resource acquisition process is further configured to perform operations including:
receiving a first resource request from the second browser, the first resource request having a URL identifying the resource acquisition process, and further specifying a network address resolvable to a first of the proprietary resources associated with the first website;
concurrently issuing, by the resource acquisition process, a second resource request for the first of the proprietary resources to the first browser, and a third resource request for the first of the proprietary resources to the first website; and
responding, by the resource acquisition process to the first resource request, with the first of the proprietary resources when the first of the proprietary resources is received from either the first browser or from the first website.

21. A method of providing proprietary resources on a co-browse session, comprising:
instantiating a co-browse service intermediate a visitor computer and an agent computer, the co-browse service being configured to implement a co-browse session between the visitor computer and the agent computer and having a resource acquisition process instantiated thereon configured to acquire the proprietary resources on the co-browse session;
the visitor computer having a first browser instantiated thereon, the first browser having a DOM describing content of the first browser, the DOM containing objects with URLs pointing to a first website, at least some of the objects being the proprietary resources, the first browser further having co-browse script loaded therein, the co-browse script configured to copy the DOM of the first browser and forward the DOM of the first browser to the agent computer via the co-browse service on the co-browse session;
the agent computer having a second browser instantiated thereon, the second browser being configured to load the DOM of the first browser received on the co-browse session and request the proprietary resources referenced in the DOM from the resource acquisition process; and
wherein the proprietary resources are resources that are fonts and Cascading Style Sheets (CSS) that are Cross-Origin Resource Sharing (CORS) protected, or that are both cookie and CORS protected, and wherein the resource acquisition process is configured to concurrently request the proprietary resources requested by the agent computer from both the visitor computer and from the first website.

22. The method of claim 21, wherein the co-browse script at the visitor browser is configured to convert a first subset of the URLs of the DOM of the first browser to cause the first subset of URLs to point at the resource acquisition process instead of to the first website prior to transmission of the DOM to the co-browse service on the co-browse session.

23. The method of claim 22:
wherein the first subset of URLs are URLs relating to images, fonts, and Cascading Style Sheets (CSS); and
wherein the proprietary resources further comprise the images.

24. The method of claim 22, further comprising providing a URL of the resource acquisition process by the co-browse service to the co-browse script on the co-browse session, and wherein the co-browse script is configured to convert the first subset of the resource URLs to point to the URL of the resource acquisition process.

25. The method of claim 22, further comprising creating a URL of the resource acquisition process by the co-browse service based on an identity of a co-browse server identified by the co-browse service to host the co-browse session, and wherein the co-browse script is configured to convert the first subset of the resource URLs to point to the URL of the resource acquisition process.

26. The method of claim 22, wherein the co-browse script is further configured to receive requests for resources associated with the first subset of the URLs from the resource acquisition process and is configured to respond to the requests for resources by providing the requested resources to the resource acquisition process.

27. The method of claim 26, wherein the co-browse script is further configured to process the requests for resources by asking for the resources from the website.

28. The method of claim 21, further comprising converting, by the co-browse service, a first subset of the URLs of the DOM of the first browser to cause the first subset of URLs to point at the resource acquisition process instead of to the first website in connection with transmission of the DOM by the co-browse service from the first browser to the agent computer.

29. The method of claim 21, wherein the agent computer has a process instantiated thereon that is configured to convert a first subset of the URLs of the DOM of the first browser to cause the first subset of URLs to point at the resource acquisition process instead of to the first website.

30. The method of claim 21, further comprising:
receiving a first resource request from the second browser, by the resource acquisition process the first resource request having a URL identifying the resource acquisition process, and further specifying a network address resolvable to a first of the proprietary resources associated with the first website;
concurrently issuing, by the resource acquisition process, a second resource request for the first of the proprietary resources to the first browser, and a third resource request for the first of the proprietary resources to the first website; and
responding, by the resource acquisition process to the first resource request, with the first of the proprietary resources when the first of the proprietary resources is received from either the first browser or from the first website.

\* \* \* \* \*